United States Patent [19]

Wennerberg

[11] Patent Number: 4,656,153

[45] Date of Patent: Apr. 7, 1987

[54] ACTIVE CARBON CONTAINING A DISPERSION OF A METAL COMPONENT AND METHOD FOR MAKING SAME

[75] Inventor: Arnold N. Wennerberg, Chicago, Ill.

[73] Assignee: Standard Oil Company (Indiana), Chicago, Ill.

[21] Appl. No.: 470,487

[22] Filed: Feb. 28, 1983

[51] Int. Cl.⁴ .................. B01J 27/20; B01J 21/18
[52] U.S. Cl. .................................. 502/182; 502/178; 502/180; 502/184; 502/185; 502/411; 502/413; 502/420; 502/427
[58] Field of Search ............ 502/180, 178, 182, 185, 502/184, 427, 420, 413, 411

[56] References Cited

U.S. PATENT DOCUMENTS

| | | | |
|---|---|---|---|
| 3,584,061 | 6/1971 | Olstowski et al. | 502/180 |
| 3,624,004 | 11/1971 | Wennerberg | 502/427 |
| 3,642,657 | 2/1972 | Wennerberg et al. | 423/449 |
| 3,726,808 | 4/1973 | Wennerberg et al. | 423/449 |
| 3,817,874 | 6/1974 | Wennerberg et al. | 502/427 |
| 3,833,514 | 9/1974 | Wennerberg et al. | 423/455 |
| 3,886,093 | 5/1975 | Dimitri | 502/406 |
| 4,031,292 | 6/1977 | Hernert | 502/182 |
| 4,065,442 | 12/1977 | Fields et al. | 502/184 |
| 4,082,694 | 4/1978 | Wennerberg et al. | 502/427 |
| 4,093,559 | 6/1978 | Fernholz et al. | 502/178 |
| 4,242,226 | 12/1980 | Siren | 502/417 |

*Primary Examiner*—Andrew A. Metz
*Assistant Examiner*—Helane Myers
*Attorney, Agent, or Firm*—James R. Henes; William H. Magidson; Ralph C. Medhurst

[57] ABSTRACT

A high surface area, porous active carbon containing a substantially uniform dispersion of a metal or metal-containing material and a method for making the same are disclosed.

17 Claims, 2 Drawing Figures

1

ACTIVE CARBON CONTAINING A DISPERSION OF A METAL COMPONENT AND METHOD FOR MAKING SAME

BACKGROUND OF THE INVENTION

1. Field of the Invention

This invention relates generally to active carbon having a metal component and more particularly concerns a substantially uniform dispersion of a metal component in a porous carbon matrix having a high surface area and a method for making same.

2. Description of the Prior Art

It is known that the presence of metals in active carbon can greatly enhance the efficiency and selectivity of the active carbon when it is employed in catalytic, sorption, or filtering applications. Attempts to incorporate metal compounds into activated carbon by conventional physical impregnation techniques have been problematical. One disadvantage with physical impregnation of activated carbon with metal compounds is that the small pores at the surface of the active carbon particles are inaccessible to liquid penetration and prevent penetration of the liquid, metal-containing impregnating solutions, thereby rendering impossible uniform and thorough impregnation of the carbon particles with metal. Furthermore, physical impregnation of the active carbon causes partial blocking of the pores of the carbon particles resulting in an appreciable reduction of the active surface area thereof. In addition, it is not possible to control to any large extent the total quantity of the metal applied to the active carbon particles by impregnation and its distribution on and in the carbon particles, with the end result that there is a substantial risk that the metal will crystallize and agglomerate in an undesirable manner on the carbon particles.

Several techniques have been proposed to overcome the problems associated with impregnating active carbon with metal compounds. For example, Dimitry, U.S. Pat. No. 3,886,093 discloses activated carbons having uniformly distributed active metal sites and a method for making such activated carbons. The method of Dimitry involves mixing an aqueous solution of a lignin salt with an aqueous solution of a transition metal salt to precipitate the transition metal and lignin as a metal lignate. The transition metal must be capable of forming a chemical bond with the lignin and in so doing precipitating the lignin from solution as a metal lignate. Dimitry discloses that the time required to complete the precipitation is less than one hour and that usually 30 minutes is sufficient for this purpose. According to Dimitry, suitably the wet metal lignate precipitate can then be dried in a spray drier. The precipitate is then carbonized at a temperature between 371° C. and 983° C. and finally activated at a temperature between 760° C. and 1065° C. Dimitry states that, although drying the metal lignate precipitate is not critical to form an activated carbon product, drying is necessary to form a high surface area end product. However, Dimitry gives neither a general disclosure nor a specific example of what it means by a "high surface" area for its end product.

Furthermore, Siren, U.S. Pat. No. 4,242,226 discloses an alternative technique in which a cation of calcium, magnesium, barium, aluminum, copper or a transition metal and an anionic group chemically bound to a polyhexose derivative are caused to react in solution, and the resulting product is precipitated either spontaneously or by adding a suitable precipitating agent. Siren discloses that, after separating the precipitate from solution, the precipitate can, if desired, be dried, for example, by spray drying. Thereafter the separated reaction product is pyrolyzed and activated using conventional techniques to form the activated carbon. In the method of Siren, suitably the polyhexose derivative employed comprises an acid polyhexose derivative and preferably the anionic groups of the polyhexose derivative comprise carboxylic acid groups, sulfonic acid groups or phosphoric acid groups. Preferably the polyhexose derivatives contain from 1 to 3 metal cations per hexose unit.

Wennerberg et al., U.S. Pat. No. 4,082,694 disclose a high surface area active carbon material which has a cage-like structure exhibiting a microporosity which contributes to over 60 percent of its surface and which has an effective BET surface area of greater than about 2,300 square meters per gram and a bulk density greater than about 2,500 grams per cubic centimeter. Wennerberg et al., disclose a process for making such high surface area active carbon by first heating an agitated combination of solid potassium hydroxide containing between 2 and 25 weight percent water and a carbonaceous material comprising coal coke, petroleum coke or a mixture thereof below about 483° C., then heating the resulting dehydrated product at a temperature between 705° C. and 983° C. to thereby form active carbon, and finally cooling the resulting activated product and removing essentially all the inorganic material therefrom by water washing to form the high surface area active carbon end product. Wennerberg et al., U.S. Pat. Nos. 3,642,657 and 3,817,874 and Wennerberg, U.S. Pat. No. 3,726,808 disclose related methods for making high surface area active carbon products.

OBJECTS OF THE INVENTION

It is therefore a general object of the present invention to provide an improved metal-containing active carbon having high porosity and surface area and a method for making same.

Other objects and advantages of the invention will become apparent upon reading the following detailed description and appended claims, and upon reference to the accompanying drawings.

SUMMARY OF THE INVENTION

These objects are achieved by an improved method of this invention for making a substantially uniform dispersion of a meral or metal-containing material in a high surface area, porous active carbon matrix, which comprises: forming a carbon precursor which contains the metal by the chemical reaction in solution of (1) a soluble carbon precursor having at least one anionic group chemically bound thereto and (2) a soluble cation of a transition metal or metal from Groups IIIA, IVA or VA of the Periodic Table or a soluble cationic complex of such metal cation; precipitating and drying the metal-containing carbon precursor; forming a uniform powdered mixture of the metal-containing carbon precursor and inorganic solids comprising an alkali metal hydroxide; pyrolyzing the powdered mixture in an inert atmosphere at a temperature in the range of from about 400° C. to about 980° C. to form the carbon matrix having the metal or metal-containing material substantially uniformly dispersed therein; and separating unreacted inorganic material and inorganic reaction products, other than the dispersed metal or metal-containing material, from the carbon matrix to form the high surface area, porous carbon matrix end product. The present invention is also the product formed according to this method.

BRIEF DESCRIPTIONS OF THE DRAWINGS

For a more complete understanding of this invention, reference should now be made to the accompanying figures and the description below by way of examples of the invention. In the figures:

FIG. 1 is a phase contrast, electron microscope photomicrograph at a relatively low total magnification ($\times 250,000$) of an active carbon having a high surface area and demonstrating a high degree of porosity produced by pyrolysis of a carbon precursor in the presence of an alkali metal hydroxide and at a rate of temperature increase of 66.5° C. per minute in the pyrolysis step; and FIG. 2 is a phase contrast, electron microscope photomicrograph at a relatively high total magnification ($\times 2,900,000$) of an active carbon having a high surface area and demonstrating a high degree of porosity produced by pyrolysis of a carbon precursor in the presence of an alkali metal hydroxide and at a rate of temperature increase of 66.5° C. per minute in the pyrolysis step.

DETAILED DESCRIPTION OF THE DRAWINGS INCLUDING PREFERRED EMBODIMENTS

Figure 1:
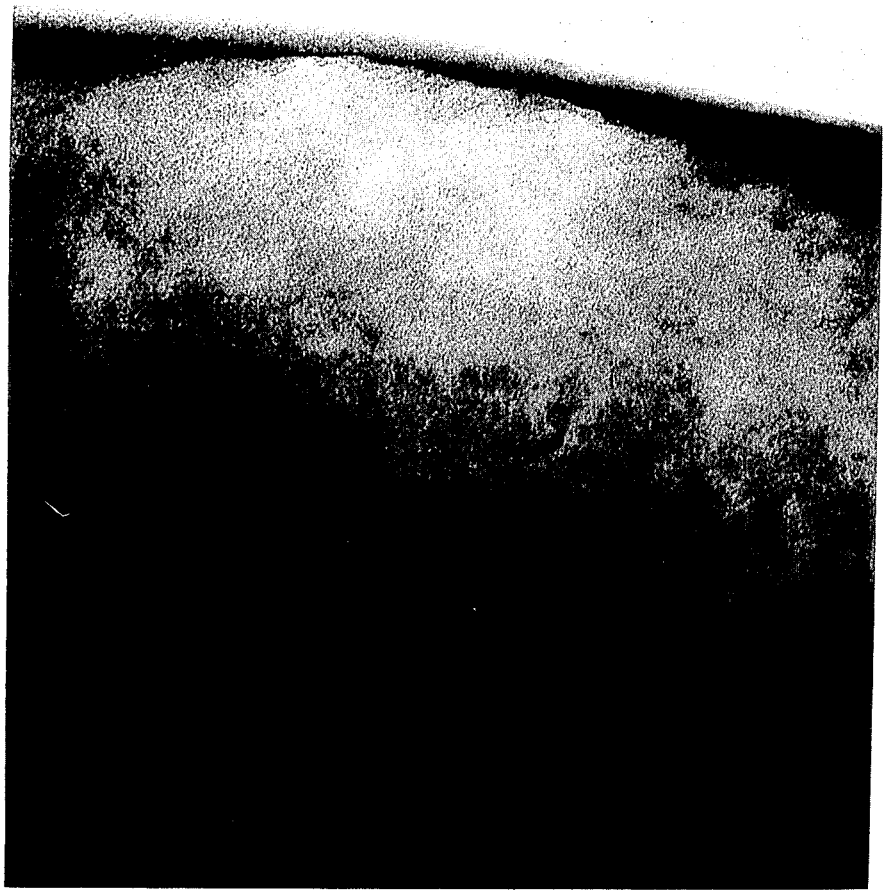

The method of this invention involves the formation of the metal-containing carbon precursor by a chemical reaction between a carbon precursor and a metal cation or a cationic complex of a metal cation. Although any convenient solvent can be employed as the solvent for this reaction, water is highly preferred as the solvent.

Suitable carbon precursors for use in the method of this invention include aromatic carboxylic acids, phenols, aromatic amines and salts of any such materials. In addition, when the inclusion of sulfur in the final porous carbon matrix is acceptable, aromatic sulfonic acids and aromatic thiols and salts of such materials can also be employed as the carbon precursor. Preferably, water-soluble metal salts of the aforesaid aromatic carboxylic acids, aromatic sulfonic acids, phenols and aromatic thiols are employed as the carbon precursors in the present invention.

The aforesaid aromatic acid may be any compound having an acid radical directly or indirectly attached to the benzene ring. The acid radical may be COOH, $SO_3H$, $SO_2NH_2$, $PO_3H$, etc. Other functional groups may be present without deleterious effect. Aromatic carboxylic acids are preferred and may be simple monocarboxylic acids, such as benzoic acid, or polycarboxylic acids, such as terephthalic, isophthalic, trimesic, and trimellitic, or polynuclear carboxylic acids, such as naphthoic acid, or polynuclear polycarboxylic acids, such as coke acids. It is also contemplated that the aromatic carboxylic acids may be derived from any suitable carbonaceous material which is subsequently oxidized to form the carboxylic acid. The feed material may be treated, when necessary or desired, to remove contaminants or undesirable elements. For example, petroleum coke has a metal content, but oxidation of petroleum coke with nitric acid serves the dual function of forming coke acid and removing metals. While petroleum coke acid having any degree of oxidation is suitable in the method of this invention, the preferred petroleum coke acid is one having an elemental oxygen content of between about 20 to 30 weight percent.

The metal in the metal-containing carbon precursor formed during the course of the method of this invention can be any transition metal or metal from Groups IIIA, IVA or VA of the Periodic Table of the Elements (Webster's New Collegiate Dictionary 1979, page 846).

In the method of this invention, the metal-containing carbon precursor is formed by chemical reaction involving a cation of the aforesaid metal or a cationic complex of such metal cation with an anionic group on the carbon precursor, wherein the metal cation or cationic complex of the metal ion is soluble in the solvent employed for this reaction. Since water is the preferred solvent, water-soluble metal cations or water-soluble cationic complexes of the metal ion are preferred for use in the method of this invention. It is of course a critical requirement of the method of this invention that the metal cation or the cationic complex of the metal ion react with the carbon precursor so as to form a chemical bond with at least one anionic group on the carbon precursor.

In the method of this invention, the carbon precursor and metal cation or cationic complex of the metal ion are combined in the solvent employed. It is generally preferred that a slight stoichiometric excess of metal cation or cationic complex thereof to carbon precursor on a solids basis be present in order to obtain a uniform and thorough distribution of metal throughout the precipitated carbon precursor. Chemical reaction between the carbon precursor and the metal cation or cationic complex of the metal ion either occurs spontaneously or is induced by adjustment of any convenient solution parameter, for example, the temperature or pH. Depending upon the particular carbon precursor used and the particular metal cation or cationic complex of the metal ion used, the reaction product thereof either precipitates out spontaneously or is precipitated by addition of a suitable precipitating agent or by adjustment of the temperature or pH of the solution, or is dried to the desired dry substance content. The resulting precipitated reaction product is then separated from solution by filtration, centrifugation or the like, and if desired, washed to remove any excess metal salt solution. The separated precipitate is then dried.

After the metal-containing carbon precursor is precipitated, separated and dried, the resulting powder is intimately mixed with the inorganic solids comprising an alkali metal hydroxide. Preferably at least 25 weight percent of the inorganic solids is the alkali metal hydroxide. Although not intending to limit the scope of the present invention by any theoretical explanation, the role of the alkali metal hydroxide in the formation of the active carbon of the present invention is believed to occur by reaction with the carbon precursor during pyrolysis to thereby propagate the formation of active carbon. The particle size of the inorganic solids need only be sufficiently small to insure that the inorganic solids disperse well enough in the metal-containing carbon precursor powder that an intimate mixture is formed. The weight ratio of alkali metal hydroxide-to-metal-containing carbon precursor in the resulting mixture is from about 1:1 to about 5:1, preferably from about 2:1 to about 4:1 and more preferably from about 2.5:1 to about 3.5:1.

Although a hydroxide of any metal of Group IA of the Periodic Table can be mixed with the metalcontaining carbon precursor in the method of this invention, potassium hydroxide is strongly preferred. In addition to its ready availability and relative low cost, potassium hydroxide is advantageous because unless potassium hydroxide is employed, it is extremely difficult to obtain a metal-containing active carbon end product having a surface area of at least 1,000 square meters per gram, without additional treatment being required. Furthermore, as will be discussed hereinbelow, potassium hydroxide is preferred because it and its carboxylate salts are highly soluble in water.

Preferably the alkali-metal hydroxide is hydrated. The water of hydration serves to assist in lowering the fusion temperature of the alkali metal hydroxide and in producing a uniform melt of the metal-containing carbon precursor and alkali metal hydroxide in the pyrolysis step before pyrolysis occurs, to thereby facilitate mixing of the alkali metal hydroxide and metal-containing carbon precursor before reaction occurs. Preferably the alkali metal hydroxide contains from 2 to 25 weight percent of water of hydration.

The inorganic solids can comprise, in addition to the alkali metal hydroxide, an alkali metal salt such as an alkali metal halide, carbonate, sulfate, phosphate, nitrate or oxide. Preferably potassium is the alkali metal in the alkali metal halide, carbonate, sulfate, phosphate, nitrate or oxide.

In the method of this invention, the intimate mixture of metal-containing carbon precursor powder and inorganic solids is then pyrolyzed under an inert atmosphere such as nitrogen gas. The pyrolysis temperature is selected to be high enough to decompose the carbon precursor and less than the graphitization temperature of carbon, that is, from about 400° C. to about 980° C., preferably from about 700° C. to about 900° C. The rate of temperature increase to which the mixture of metal-containing carbon precursors and inorganic solids is subjected in the pyrolysis chamber is preferably at least 35° C. per minute and more preferably at least 300° C. per minute. Such rates of temperature increases of at least several hundred degrees centigrade per minute are readily attainable with microwave heating. Higher rates at which the temperature of the mixture is raised from ambient temperature to the final pyrolysis temperature effectively neutralize the tendency toward the formation of separate phases as a result of differences in the temperatures and rates at which the carbon precursor and of the metal therein pyrolyze. Such phase separation is manifested by relatively larger crystal growth for the metal or metal-containing material dispersed in the active carbon end product and thus is detectable by a relative increase in the crystallite size of the dispersed metal or metal-containing material and by relative decreases in the uniformity of dispersion of the metal or metal-containing material and of the accessible surface area of the dispersed metal or metal-containing material.

Following the pyrolysis step, while still under a blanket of inert gas, the pyrolysis chamber and its contents are cooled and the powdered pyrolysis product is suspended in a suitable liquid preferably water, in the blanketed pyrolysis chamber and then transferred as a slurry to a receiver. The solvency of the slurry liquid must be controlled to insure that the dispered metal or metal-containing material does not dissolve in the slurry liquid. For example, when substantially neutral water is employed as the slurry liquid, the resulting slurry of the powdered pyrolysis product is alkaline and has a pH of about 12. Under these conditions, if the metal dispersed in the active carbon is in the form of an amphoteric metal oxide, the metal oxide would dissolve in the water and would thereby be removed from the active carbon. For example, dispersed $Al_2O_3$, $SiO_2$, $WO_3$, $MoO_3$, $V_2O_3$ and $SnO_2$ would dissolve as $KAlO_2$, $K_2SiO_3$, $K_2WO_4$, $K_2MoO_4$, $KVO_3$ and $K_2SnO_2$, respectively. Since it is necessary to prevent solubilization of the dispersed metal oxide, the pH of the water would have to be reduced to about 7.0–8.0 with a suitable acid solution such as acetic acid, or vapor such as carbon dioxide or acetic acid vapor, before being used to rinse and slurry the powdered pyrolysis product.

The slurry is then filtered to separate the powdered pyrolysis product from the slurry liquid. Thereafter the powdered product is purified by repeated washings with a suitable solvent, preferably water, to remove the alkali metal therefrom and yet to leave undissolved the dispersed metal or metalcontaining material in solid form in the active carbon matrix. When water is used as the wash solvent and when the dispersed metal is in the form of an amphoteric metal oxide, the pH of the water should be from 7 to 8 to insure dissolution of the alkali metal in the water but to prevent dissolution of the dispersed metal oxide. Since potassium salts are more soluble than the corresponding salts of the other alkali metals, it is highly preferred that potassium is the alkali metal in the alkali metal hydroxide and in any alkali metal salt mixed with the metal-containing carbon precursor prior to the pyrolysis step to facilitate removal thereof from the active carbon end product.

Thereafter the powdered product is dried using any conventional and suitable drying technique.

The active carbon of the instant invention has a cage-like structure which contributes preferably to over sixty percent of its surface and, more preferably, to over 80 percent of its surface and, most preferably, to over 90 percent of the carbon surface, as measured by phase contrast, high resolution electron microscopy. This cage-like structure is characterized in that the individual cages are of a size to exhibit properties of microporosity, that is, essentially complete filling of the individual cages by the adsorbate at low effective concentration to give a large micropore volume.

Figure 2:
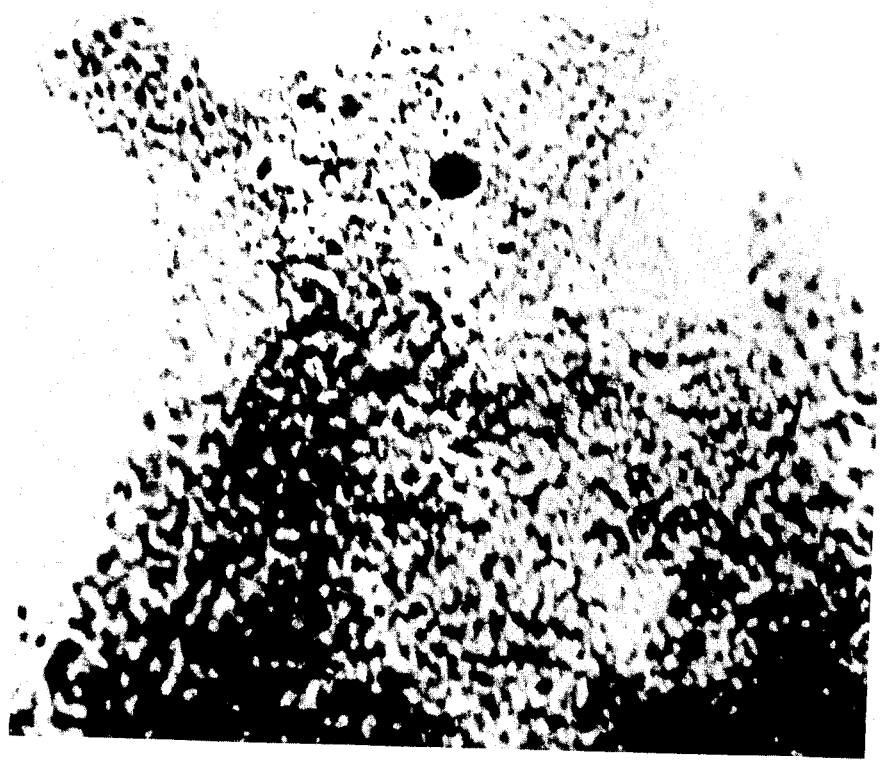

The cages in the cage-like structure are substantially homogeneous in size as illustrated by the electron photomicrographs in FIGS. 1 and 2 taken by phase contrast, high resolution electron microscopy of active carbon containing 3.6 weight percent of platinum and formed according to the method of the invention of my copending patent application Ser. No. 470,285 now U.S. Pat. No. 4,482,641 filed concurrently with the present application, which method, like the method of the present invention, also involves pyrolysis of a mixture of potassium hydroxide, a carbon precursor and a metal precursor. The individual cages are clearly evident and appear to be formed using single sheets of graphitic-type lamellae, as shown in FIG. 2. This cage-like structure is responsible for the multi-layer adsorption demonstrated by the carbons of this invention and the extremely large effective surface areas as measured by the BET method. Use of the alkali metal hydroxide in the pyrolysis step of both the method of this invention and the method of my aforesaid copending application, Ser. No. 470,285 now U.S. Pat. No. 4,482,641 is responsible for the development of the cage-like structure having a large effective surface area and porosity. The micrographs in FIGS. 1 and 2 are at magnification of ×250,000 and ×2,900,000, respectively, and were taken by phase contrast, high resolution electron microscopy with a Hitachi model HU-12 electron microscope and a JEOL model 100C electron microscope, respectively.

The active carbon product produced preferably has an effective BET surface area greater than about 800 square meters per gram, more preferably, greater than about 1,600 square meters per gram, and, most preferably, greater than about 2,000 square meters per gram. The active carbon preferably has a bulk density which is preferably greater than about 0.1 gram per cubic centimeter and, more preferably, greater than about 0.2 gram per cubic centimeter.

Any transition metal or metal of Groups IIIA, IVA or VA of the Periodic Table of the Elements or any combination thereof or a material containing any such metal or combination can be dispersed in the active carbon matrix in the composition of the present invention. Preferably the dispersed metal and the metal in the dispersed metal-containing material is platinum, palladium, rhodium, molybdenum, chromium, aluminum, silicon, tungsten, iron, cobalt, nickel, silver or copper. Preferably the dispersed metal-containing material is a metal oxide. Except as discussed hereinbelow, the concentration of the dispersed metal or metal-containing material in the active carbon end product in the composition of this invention depends on the stoichiometry of the reaction between the carbon precursor and metal cation or complex in forming the metal-containing carbon precursor and the relative amounts of the carbon precursor and metal cation or complex that react.

The concentration of the dispersed metal or metal-containing material in the active carbon composition of this invention can be increased to a level above the concentration limit imposed by the stoichiometry of the reaction between the carbon precursor and metal cation or complex to form the metal-containing carbon precursor, simply by repeating the pyrolysis step of the method of this invention to remove some of the carbon matrix by oxidation thereof and thereby to produce an effective increase of the concentration of the dispersed metal or metal-containing material in the carbon matrix. In such case, the initial end product of the method of this invention and inorganic solids comprising an alkali metal hydroxide are mixed to form a uniform powdered mixture thereof. This powdered mixture is then pyrolyzed in an inert atmosphere at a temperature in the range of from about 400° C. to about 980° C. to form the carbon matrix having the metal or metal-containing material substantially uniformly dispersed therein and at a higher concentration level than in the initial end product of the method of this invention. Thereafter unreacted inorganic material and inorganic reaction products, other than the dispersed metal or metal-containing material, are separated from the carbon matrix, as described above.

Although the crystallite size of the dispersed metal or metal-containing material depends on the metal, the form in which it is dispersed, and the rate of increase of temperature to which the mixture of metal-containing active carbon and inorganic solids were subjected during the pyrolysis step of the method of this invention, the crystallite size of the dispersed metal or metal-containing material is generally in the range of from about 5 Å to about 30 Å of the dispersed metal or molecules of the dispersed metal-containing material. For example, when platinum is the metal in the metal-containing carbon precursor in the method of this invention, and when the rate of temperature increase in the pyrolysis step is at least 35° C. per minute, the platinum is dispersed in the end product predominantly as platinum metal having an average crystallite size equivalent to from 5 Å to 50 Å.

The composition of the present invention possesses substantially improved resistance to thermally or chemically induced sintering or recrystallization of the dispersed metal or metal-containing material to form a dispersed material of relatively larger crystallite size and relatively lower effective surface area. Upon exposure to high temperatures, for example, 900°–1150° C. for 12 hours, or certain chemical treatments, for example, with 106 percent phosphoric acid for 65 hours at 200° C., the crystals of dispersed metal or metal-containing material recrystallize to form larger crystals. The larger crystals are formed from the smaller crystals by aggregation of the smaller crystals. The use of a higher rate of temperature increase in the pyrolysis step in the method of this invention affords a product having greater resistance to thermally or chemically induced sintering or recrystallization.

The dried end product of the method of this invention generally has a particle size in the range of from about 25 to about 28 microns and in that size range is suitable for use in many applications. However, in certain applications such as a catalyst for use in a packed or fluidized bed, it may be desirable or necessary to employ larger particles.

A suitable, low cost granular activated carbon having a high surface area and a suitable particulate form with sufficient crush strength and abrasion resistance comprises a clay binder which is capable of forming a high viscosity gel when dispersed in water, for example, the montmorillonite clays. The montmorillonites enable the carbon to retain a high percentage of its effective surface area. In fact, the loss of effective surface area due to the presence of the clay binder is only about equal to the relative percentage of clay binder present. Hence, for a granular activated carbon containing 15 weight percent montmorillonite, the effective surface area would be only about 15 percent less than the effective surface area of the powdered activated carbon used as the starting material. The aforesaid granular activated carbon containing clay binder may be prepared in any size or shape desired. A characteristic of the granular activated carbon containing montmorillonite clay binder is that it retains throughout the fabricated form the average pore size of the powdered carbon starting material. Such granular activated carbons are also characterized by a good high temperature strength and crush strength. The weight ratio of activated carbon to clay binder in such granular activated carbon is from about 90:10 to about 70:30, on a dry basis.

A suitable process for preparing the aforesaid granular activated carbon comprises the steps of: (a) blending the activated carbon with a powdered montmorillonite clay binder in the presence of sufficient water to achieve a composition having from about 30 to about 40 weight percent solids and a carbon:binder weight ratio of from about 90:10 to about 70:30; (b) compounding the composition to achieve dispersion of the clay binder in the aqueous phase and penetration of the resulting aqueous-binder phase into the interstitial spaces between the activated carbon particles; (c) extruding the composition through an orifice to form an extrudate; (d) drying the extrudate at a maximum temperature of about 191° C. in a manner so as to minimize the shock effects of rapid water evaporation from the porous carbon and secondary carbon surface oxidation by water vapor; and (e) curing the extrudate at a temperature sufficient to effect a physical-chemical change in the extrudate which is manifested by increased hardness and stability.

Suitable curing temperatures are from about 744° C. to about 1038° C., preferably in the range from about 899° C. to about 927° C.

Drying is preferably accomplished by a gradual increase in temperature to minimize the effects of water evaporation on the strength of the carbon structure. A time-temperature profile which has been found effective comprises air drying the extrudate material an increasing temperatures wherein the temperature is increased at a rate of about 2.8° C. permitted until a drying temperature of 94° C. is reached. Thereafter the temperature is increased at a rate of 5.5° C. permitted until a maximum drying temperature of 191° C. is reached. Total drying time is from about 45 minutes to about 1 hour. The resulting water content is about 2 weight percent.

In the alternative, the active carbon of this invention can be granulated with alumina using the procedure exemplified in Examples 3–4 hereinbelow.

It may also be desirable in certain instances to reduce the particle size of the metal-containing active carbon of this invention below the aforesaid range of 25–28 microns. In such cases, the active carbon end product of the method of this invention can be milled by any convenient method to small particle sizes. A major advantage of the uniform distribution of metal or metal-containing material in the method of this invention is that reduction of the particle size by milling or attrition does not affect the distribution of the dispersed metal component within the active carbon or on its exterior surface and hence of the availability or accessibility of the dispersed metal component.

The composition of this invention is useful for all the uses to which prior art active carbon compositions have been put, for example, as sorbents in such applications as water treatment and gas and vapor adsorption. In addition, the composition of the present invention is useful as a support for catalysts, or as a catalyst itself, for example, to catalyze hydrogen transfer reactions involving hydrocarbons.

While the invention is described in connection with the specific examples below, it is to be understood that these are for illustrative purposes only. Many alternatives, modifications and variations will be apparent to those skilled in the art in the light of the below examples and such alternatives, modifications and variations fall within the scope and spirit of the appended claims.

EXAMPLE 1

A solution of 82 grams of chromic sulfate ($Cr_2(SO_4)_4 \cdot 18H_2O$) in 100 grams of water is combined with a solution of 127 grams of sodium terephthalate in 800 grams of water at room temperature. A precipitate of chromic terephthalate containing about 16 weight percent of chromium forms and settles out. Upon completion of precipitation, the precipitate is separated from solution by filtration and is dried.

20 grams of the precipitate powder are then dry blended with 54.06 grams of 90 percent potassium hydroxide powder and 59.89 grams of potassium carbonate powder in a Waring blender to produce 134 grams of a uniform powdered mixture. This entire powdered mixture is transferred to a rotating quartz calcining tube equipped for continuous argon purge, placed in a tubular furnace, and preheated to 650° C. The temperature of the powdered mixture rises at a rate of 66.7° C. per minute to 650° C. The quartz tube remains in the furnace during its heat up and during the one-hour period at 650° C., during which time the powdered mixture pyrolyzes to form a powdered pyrolysis product and after which time the tube is withdrawn from the furnace and allowed to cool to ambient temperature. The quartz tube and its contents are maintained under a blanket of argon throughout the period before introduction of the powdered mixture into the quartz tube, during the pyrolysis and during cool down of the quartz tube and its contents to ambient temperature. While still under an argon blanket, the cooled pyrolysis product is rinsed with water from the cooled quartz tube. After separation from the water, the pyrolysis product is repeatedly washed with water to remove the potassium salts therefrom, until a resulting wash water has a pH of 7. A final wash with a solution of 1 weight percent of acetic acid in water is performed to remove the last traces of potassium salts from the pyrolysis product. The resulting washed pyrolysis product is dried in a vacuum oven at 105° C. under a nitrogen blanket.

The resulting dried pyrolysis product contains 40–50 weight percent of chromia by weight, based on the weight of the pyrolysis product.

EXAMPLE 2

A solution of 83 grams of ferrous sulfate ($FeSO_4 \cdot 7H_2$)) in 600 grams of water is combined with a solution of 63 grams of sodium terephthalate in 400 grams of water at room temperature. A precipitate of ferrous terephthalate containing about 25 weight percent of iron forms and settles out. Upon completion of precipitation, the precipitate is separated from solution by filtration and is dried.

The procedure of Example 1 is repeated, with the difference of inserting the powdered mixture of ferrous terephthalate, potassium hydroxide and potassium carbonate into the purged quartz tube at ambient temperature and then inserting the tube into the furnace.

The resulting dried pyrolysis product contains 50–60 weight percent of iron by weight, based upon the weight of the pyrolysis product. The iron is predominantly in the form of elemental iron.

EXAMPLE 3

32 grams of the product of Example 1 is blended with 309 grams of an acid stabilized aqueous alumina hydrosol containing 32 grams of alumina. The mixture is gelled (solidified) by the addition of a solution containing 7.7 milliliters of water and 7.7 milliliters of a 50 percent aqueous solution of ammonium hydroxide. The resulting mixture is then dried overnight in a forced air oven at 165° C. The dried solid is calcined at 483° C. for 48 hours. The resulting granulated product contains 20–25 weight percent of chromia, 50 weight percent of alumina, and the remainder is active carbon.

EXAMPLE 4

The procedure of Example 3 is repeated using instead a blend of 7 grams of the product of Example 2 and 67.9 grams of the aqueous alumina hydrosol. The resulting granulated product contains 25–30 weight percent of iron, 50 weight percent of alumina, and the remainder is active carbon.

EXAMPLES 5-6

The utility of the composition of the present invention as hydrocarbon conversion catalysts, more particularly as catalysts for hydrogen transfer reactions involving hydrocarbons, is illustrated in Examples 5-6. In particular, Example 5 illustrates the use of a composition of this invention as a catalyst for the hydrogenation of hydrocarbons, and Example 6 illustrates the use of a composition of this invention as a catalyst for the dehydrogenation of hydrocarbons.

In each of Examples 5 and 6 a tubular reactor having a cross sectional area of 1.27 square centimeters and containing a 13-centimeter high bed of the catalytic composition formed in Examples 3 and 4, respectively, is employed.

A gaseous hydrocarbon feed is passed downward through the catalyst bed with hydrogen in Example 5, and with argon in Example 6. The hydrocarbon feed is propylene in Example 5 and propane in Example 6. The hydrocarbon feed rate is 1.31 standard liters per hour in each of Examples 5 and 6. The hydrogen feed rate is 3.6 standard liters per hour in Example 5. The argon feed rate in Example 6 is 2.5 standard liters per hour. The catalyst bed temperatures are 65° C. and 480° C. for Examples 5 and 6, respectively. The pressures in the reactor are 3.51 and 4.92 kilograms per square centimeter in Examples 5 and 6, respectively.

The compositions of this invention demonstrate high activity and selectivity for the hydrogenation reactions and relatively lower activity but very high selectivity for the dehydrogenation reactions.

From the above description, it is apparent that the objects of the present invention have been achieved. While only certain embodiments have been set forth, alternative embodiments and various modifications will be apparent from the above description to those skilled in the art. These and other alternatives are considered equivalents and within the spirit and scope of the present invention.

What is claimed is:

1. A method for forming a substantially uniform dispersion of a metal or metal-containing material in a high surface area, porous active carbon matrix, comprising:
   forming a carbon precursor which contains the metal by the chemical reaction in solution of (1) a soluble salt of an aromatic carboxylic or sulfonic acid or of a phenol or thiol and (2) a soluble cation of a transition metal or metal from Groups IIIA, IVA or VA of the Periodic Table or a soluble cationic complex of such metal cation;
   precipitating and drying the metal-containing carbon precursor;
   forming a uniform powdered mixture of the metal-containing carbon precursor and inorganic solids comprising an alkali metal hydroxide;
   pyrolyzing the powdered mixture in an inert atmosphere by raising the temperature of the powdered mixture at a rate of at least 35° C. per minute to a temperature in the range of from about 400° C. to about 980° C. to form the carbon matrix having the metal or metal-containing material substantially uniformly dispersed therein; and
   separating unreacted inorganic material and inorganic reaction products, other than the dispersed metal or metal-containing material, from the carbon matrix to form the high surface area, porous carbon matrix end product.

2. The method of claim 1 wherein the metal-containing material is a metal oxide.

3. The method of claim 1 wherein the dispersed metal and metal in the dispersed metal-containing material is platinum, palladium, rhodium, molybdenum, chromium, aluminum, silicon, tungsten, iron cobalt, nickel, silver or copper or a mixture thereof.

4. The method of claim 1 wherein at least a stoichiometric equivalent of the metal cation or cationic complex thereof to the carbon precursor is employed.

5. The method of claim 1 wherein the carbon precursor is a salt of an aromatic carboxylic acid.

6. The method of claim 1 wherein the metal-containing carbon precursor is formed in aqueous solution.

7. The method of claim 1 wherein the weight ratio of the metal-containing carbon precursor-to-the alkali metal hydroxide in the uniform powdered mixture is in the range of from about 1:1 to about 1:5 calculated on a dry basis.

8. The method of claim 1 wherein the inorganic solids comprise potassium hydroxide or a mixture of potassium hydroxide and at least one of potassium carbonate and potassium chloride.

9. The method of claim 7 wherein at least 25 weight percent of the inorganic solids is potassium hydroxide.

10. The method of claim 1 wherein the porous carbon matrix is active carbon having a BET surface area of at least 800 square meters per gram and a bulk density of at least 0.1 gram per cubic centimeter.

11. The method of claim 10 wherein the active carbon has a BET surface area of at least 1,600 square meters per gram.

12. The method of claim 1, comprising additionally;
   forming a uniform powdered mixture of the end product of claim 1 and inorganic solids comprising an alkali metal hydroxide;
   pyrolyzing the powdered mixture in an inert atmosphere by raising the temperature of the powdered mixture at a rate of at least 35° C. per minute to a temperature in the range of from about 400° C. to about 980° C. to form the carbon matrix having the metal or metal-containing material substantially uniformly dispersed therein and at a higher concentration level than in the end product of claim 1; and
   separating unreacted inorganic material and inorganic reaction products, other than the dispersed metal or metal-containing material, from the carbon matrix to form the high surface area, porous carbon matrix having the metal or metal-containing material substantially uniformly dispersed therein and at a higher concentration level than in the end product of claim 1.

13. The method of claim 12 wherein the weight ratio of the end product of claim 1-to-the alkali metal hydroxide in the uniform powdered mixture is in the range of from bout 1:1 to about 1:5 calculated on a dry basis.

14. The process of claim 12 wherein the inorganic solids comprise potassium hydroxide or a mixture of potassium hydroxide and at least one of potassium carbonate and potassium chloride.

15. The method of claim 14 wherein at least 25 weight percent of the inorganic solids is potassium hydroxide.

16. The product formed according to claim 1.

17. The product formed according to claim 12.

* * * * *